United States Patent
Gresock

(12) 
(10) Patent No.: US 7,219,680 B1
(45) Date of Patent: May 22, 2007

(54) BACKPACK HUNTING BLIND

(76) Inventor: Alex S. Gresock, 8887 Beverly, Interlochen, MI (US) 49643

( * ) Notice: Subject to any disclaimer, the term of this patent is extended or adjusted under 35 U.S.C. 154(b) by 131 days.

(21) Appl. No.: 10/809,722

(22) Filed: Mar. 25, 2004

Related U.S. Application Data

(60) Provisional application No. 60/458,913, filed on Mar. 29, 2003.

(51) Int. Cl.
| | |
|---|---|
| *E04H 15/02* | (2006.01) |
| *E04H 15/04* | (2006.01) |
| *E04H 15/30* | (2006.01) |
| *E04H 15/46* | (2006.01) |

(52) U.S. Cl. ............................ 135/90; 135/95; 135/96; 135/139; 135/161; 135/901; 182/187

(58) Field of Classification Search ................ 135/901, 135/96, 95, 139, 140, 143, 161; 43/1; 182/142, 182/147, 187, 188; 224/153, 154, 155
See application file for complete search history.

(56) References Cited

U.S. PATENT DOCUMENTS

| | | | | |
|---|---|---|---|---|
| 3,052,251 | A | * | 9/1962 | De Jean, Jr. ................... 135/96 |
| 3,116,808 | A |   | 1/1964 | Riley |
| 3,358,789 | A | * | 12/1967 | Laun .......................... 182/113 |
| 3,545,461 | A | * | 12/1970 | Carlson ....................... 135/90 |
| 3,609,905 | A | * | 10/1971 | Fuhrman et al. ................. 43/1 |
| 3,902,264 | A | * | 9/1975 | Radig .............................. 43/1 |
| 3,990,536 | A |   | 11/1976 | Wilburn |
| 4,120,379 | A |   | 10/1978 | Carter |
| 4,134,474 | A | * | 1/1979 | Stavenau et al. ........... 182/187 |
| 4,148,376 | A |   | 4/1979 | Campbell, Jr. |
| 4,493,395 | A |   | 1/1985 | Rittenhouse |
| 4,582,165 | A |   | 4/1986 | Latini |
| 4,951,696 | A | * | 8/1990 | Jones, Sr. ..................... 135/90 |
| 5,613,512 | A | * | 3/1997 | Bean ........................... 135/90 |
| 5,975,389 | A |   | 11/1999 | Braun et al. |
| 6,021,794 | A |   | 2/2000 | Guerra |
| 6,431,192 | B2 |   | 8/2002 | OHare |
| 6,510,922 | B1 | * | 1/2003 | Hodnett ...................... 182/187 |
| 2002/0078988 | A1 |   | 6/2002 | Valpredo |

\* cited by examiner

*Primary Examiner*—Tamara L. Graysay
(74) *Attorney, Agent, or Firm*—Northern Michigan Patent Law, PLC

(57) ABSTRACT

A backpackable, collapsible blind designed to be mounted against a tree for use by hunters and others. The blind has a backpack-capable frame with canopy support arms that are collapsible against the frame for use as a backpack, a removable canopy, and a seat on a lower part of the frame that can be used to support a backpack load. The support arms define a unique upper/lower support structure for the canopy relative to the seat, with the canopy having a generally triangular opening located above the seat and a lower end or hem that hangs below the seat and the lower end of the frame for a baseless, open-bottomed blind that is useful for nearly any hunting situation.

17 Claims, 14 Drawing Sheets

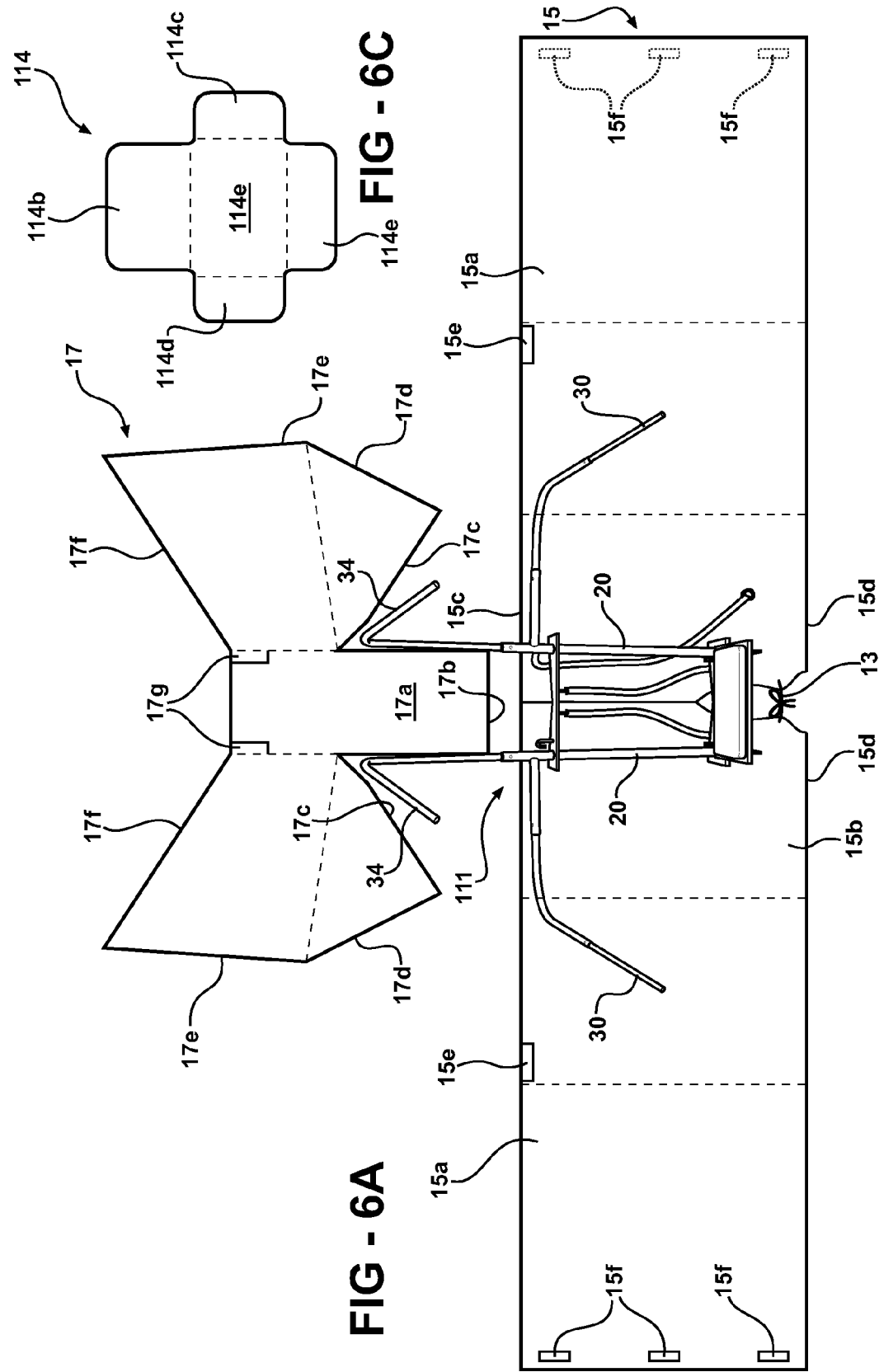

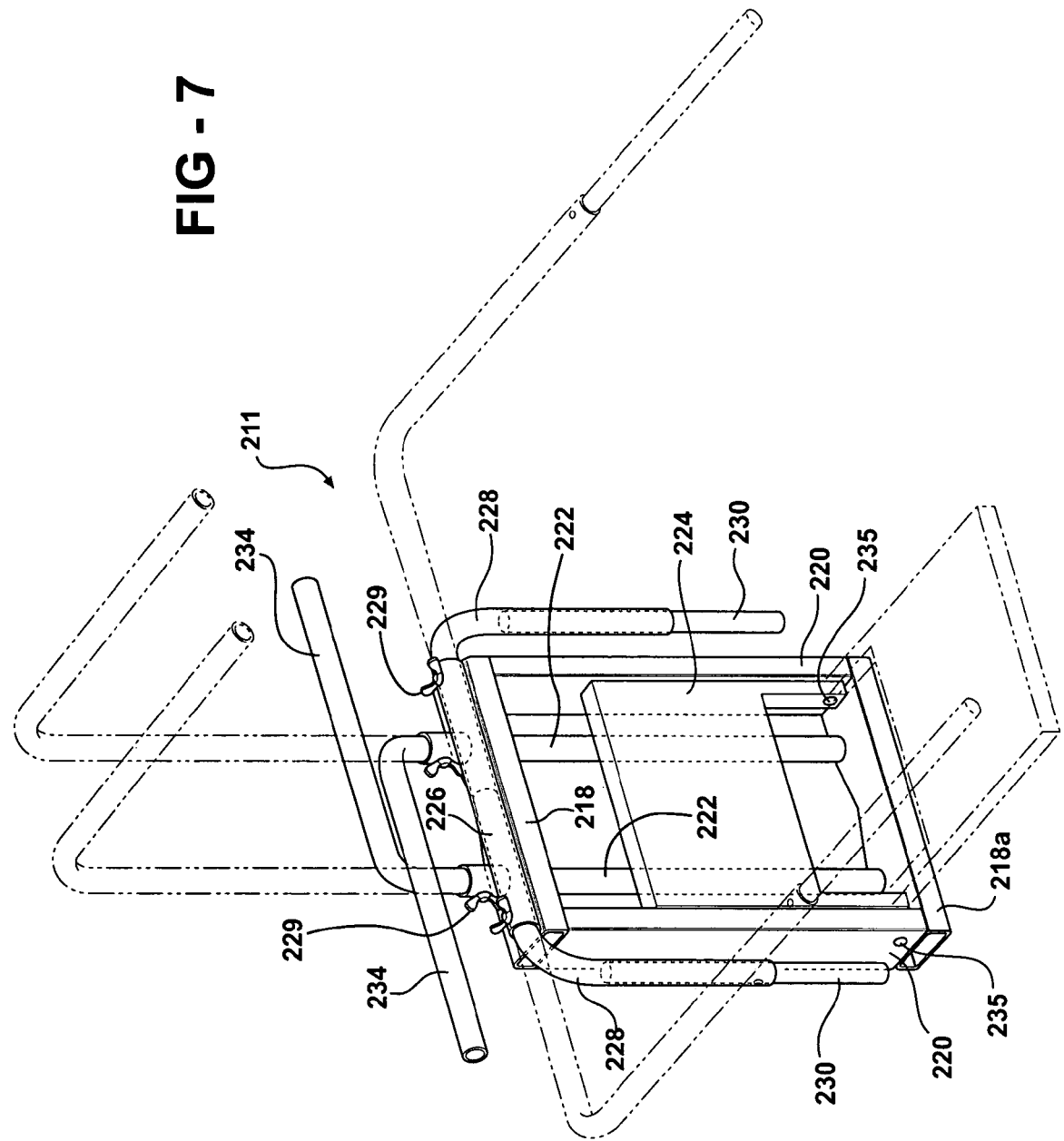

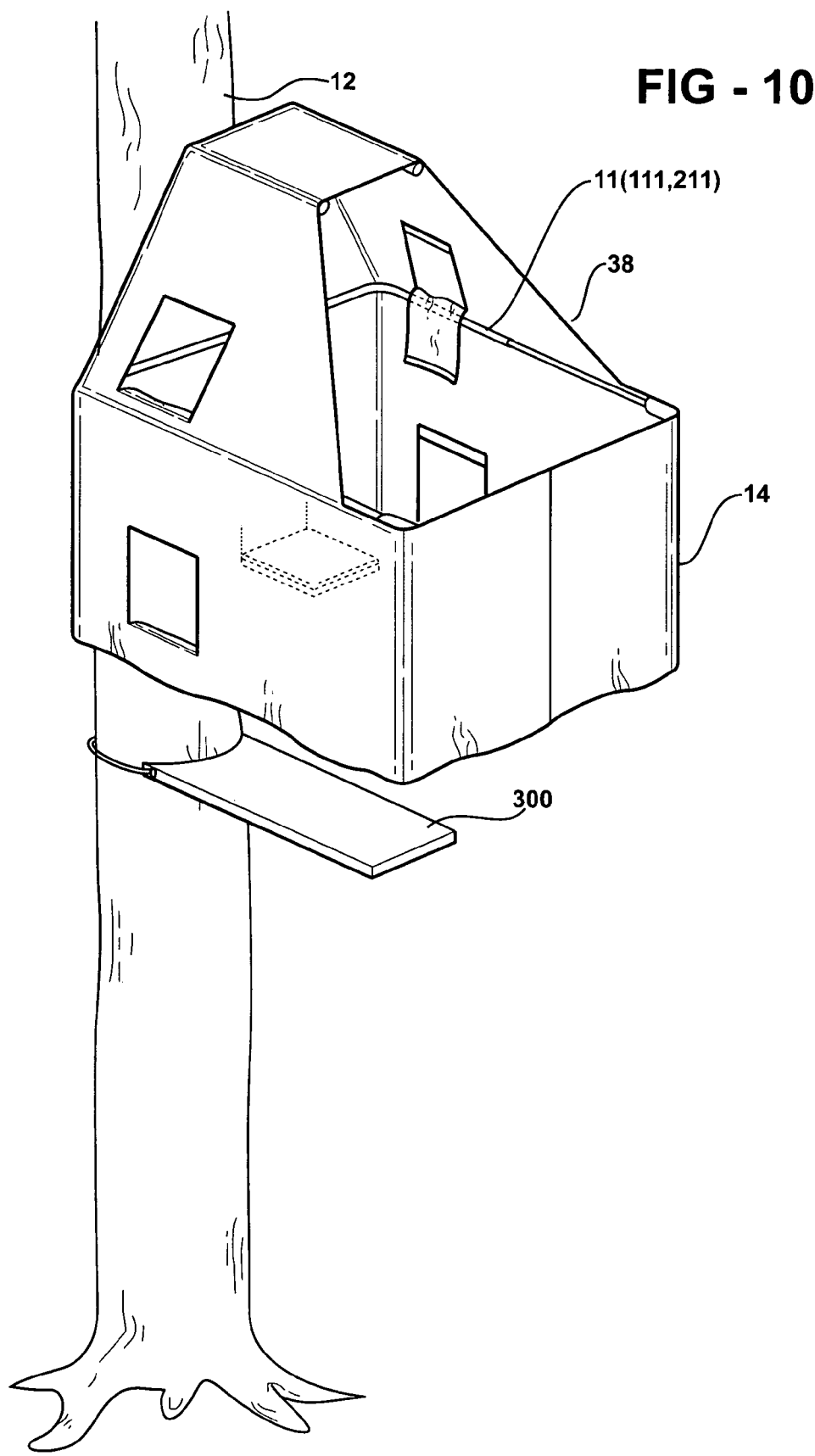

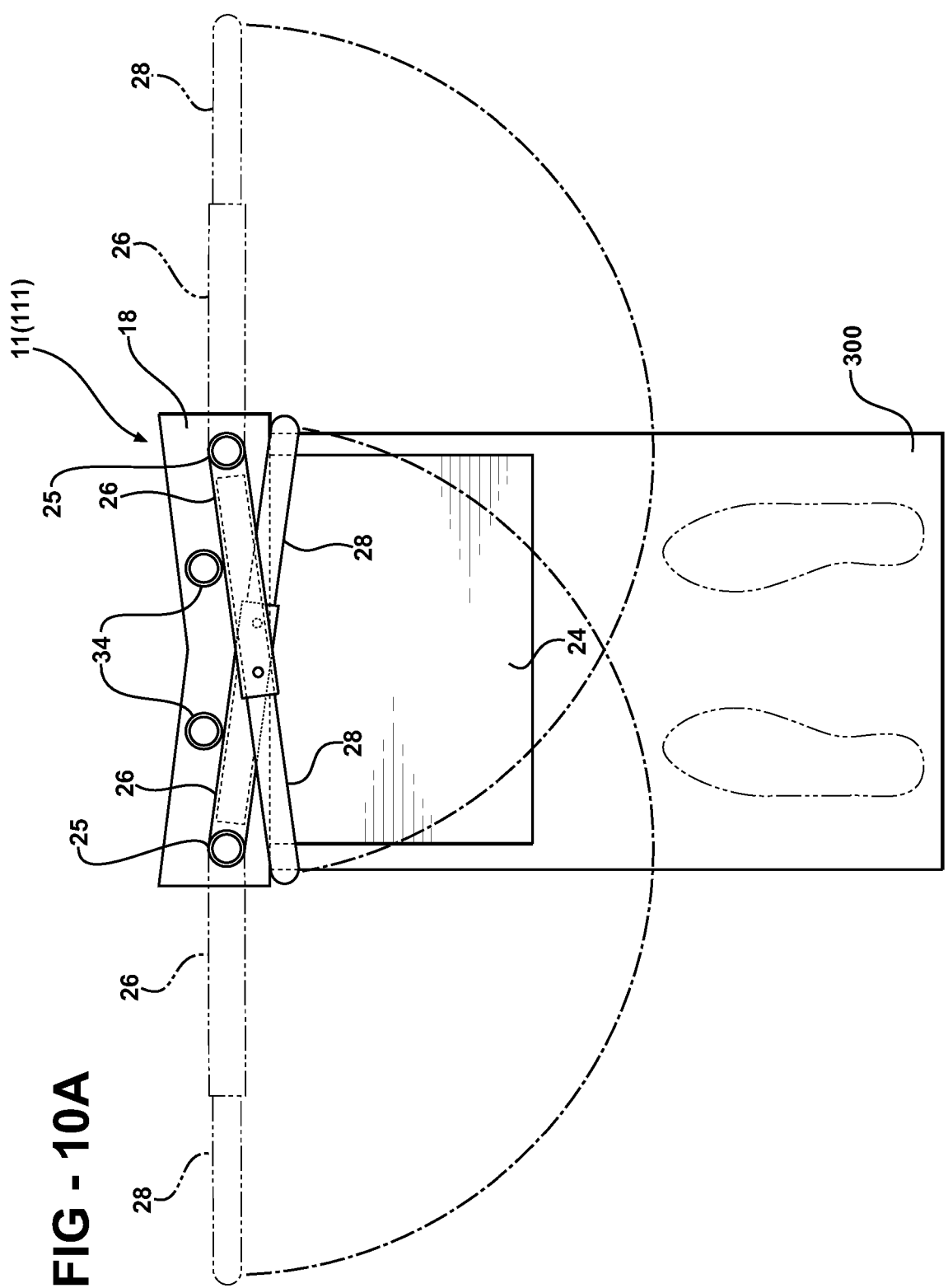

BACKPACK HUNTING BLIND

RELATED APPLICATIONS

This application claims the benefit of U.S. Provisional Application No. 60/458,913, filed Mar. 29, 2003 by the same inventor (Gresock).

FIELD OF THE INVENTION

The present invention is in the field of collapsible, man-portable hunting blinds and treestands.

BACKGROUND OF THE INVENTION

Portable hunting blinds and treestands are generally known, including some that can be collapsed or folded and carried like backpacks. However, known blinds and treestands are usually designed for one specific hunting situation, and therefore lack flexibility and adaptability to the many different types of hunting available throughout the year. Ground hunting, elevated treestand hunting, and hunting in flooded timber are three common types of hunting where some sort of stand or blind is often used, and hunters often use several different types of blind or treestand to accommodate all of them.

The problem is complicated by the large quantity of gear a hunter typically carries into the woods, including things such as firearm and ammunition, bow and arrows, optical equipment, food, water, extra clothing, licenses, field dressing equipment, flashlight, and more. Some blinds and treestands are designed to be carried like backpacks, such as the canopy-enclosed blinds disclosed in U.S. Pat. No. 3,990,536 to Wilburn and U.S. Pat. No. 6,021,794 to Guerra, whose frames double as backpacks for carrying the collapsed blinds. The resulting backpacks, however, seem designed primarily as self-carrying devices for the blind components, and do not appear able to carry much gear. U.S. Pat. No. 4,148,376 to Campbell, Jr., U.S. Pat. No. 4,582,165 to Latini, and U.S. Pat. No. 5,975,389 to Braun et al. disclose treestands whose frames function as backpack frames on the way in and out of the woods for carrying gear and game, but none provides an enclosed blind or shelter. U.S. Pat. No. 4,493,395 to Rittenhouse discloses a treestand with a canvas shelter, but it does not appear to be adapted for use as a backpack. None of the foregoing is believed to carry both itself and gear well, while additionally providing shelter and a truly all-around hunting blind.

Some prior blinds are designed to work in complementary fashion with treestands where, for example, it might be desirable to use a blind for its weather protection along with a treestand for its elevated hunting position. Examples are U.S. Pat. No. 6,431,192 to O'Hare and U.S. Patent Application Publication No. 2002/0078988 to Valpredo. O'Hare discloses a blind with two arched, fabric-paneled sidewalls that can either be mounted to the ground with stakes, or retrofitted to an existing treestand with a relatively bulky, T-shaped, non-loadbearing support base by lashing it onto the treestand with cable ties. The fabric-paneled sidewalls are mounted on the base in a "V" shape; the spacing of the sidewalls can be adjusted by telescoping extension arms on the base of the T, and the angle of the sidewalls can be adjusted through pivoting sockets or elbows on the ends of the base. Valpredo discloses a portable hunting blind with a frame whose base can either be placed in freestanding fashion on the ground, or mounted on a large treestand platform with brackets and bolts.

The O'Hare and Valpredo blinds, however, are not believed to be as easily transported as the backpack type blinds, and either do not offer much weather protection (O'Hare) or do not appear to be useful with small, backpack-portable treestands (Valpredo).

Finally, none of the prior blinds or treestands is believed to be particularly well-suited for flooded timber hunting, where the hunter typically wants to be positioned near ground level but is hampered by as much as several feet of water.

BRIEF SUMMARY OF THE INVENTION

The present invention is a lightweight, compact, backpack style hunting blind that comfortably carries itself plus gear; that provides excellent weather protection and concealment; and that is well-suited for ground hunting, elevated treestand hunting, and flooded timber hunting. It will be understood that although the term "blind" is used in keeping with the invention's most likely and preferred use as a hunting blind, people may find non-hunting uses where a backpack-portable, tree-mountable enclosure is desired, for example wildlife observation, or shielding spectators at outdoor events.

The blind includes a baseless frame that functions as backpack frame, tree mount, seat, and canopy support. The frame includes side uprights joined by upper and lower cross- or yoke-members, the yokes designed to fit against a tree, for example with shallow curved or V-shaped tree-engaging faces. A lower part of the frame includes a seat that extends away from the tree-engaging side of the frame, the seat forming a shelf for supporting gear when the frame is used as a backpack. The seat is preferably removably attached to the frame, or foldable against the frame, for certain hunting situations.

The frame also includes two pairs of collapsible canopy support arms: a wider, lower pair located above the lower yoke and seat for supporting the main body portion of a canopy, preferably at or above the level of the upper yoke; and, an upper, narrower pair of support arms above the lower pair for supporting a roof portion of the canopy. The arms extend away from the tree-engaging side of the frame when extended, preferably parallel to one another, although some degree of adjustment may be provided to help tension a canopy. The lower arms extend further from the tree than the upper arms when fully extended, such that the endpoints of the arms define a trapezoidal or triangular plane angled toward the tree when set up. The arms are preferably capable of being collapsed in substantially flat fashion against the frame, for example with a combination of telescoping and folding connections.

The frame is baseless in the sense that it has no self-supporting lateral base; the vertical frame is fastened to the side of a tree or similar object for support. The seat is the lowermost lateral projection from the frame, the lower end of the frame otherwise being open and unsupported, designed to be elevated off the ground when the frame is mounted to a tree, the seat extending out over open space at or above the level of the lower end of the frame such that a hunter's legs and feet will extend freely below the frame when seated. The support arms on the baseless frame support a canopy in free-hanging fashion, with a lower end or hem of the canopy hanging below the lower end of the frame when the frame is mounted to a tree, preferably a distance beyond the legs and feet of a seated hunter. In flooded timber the frame can be mounted to the side of a tree with the seat above water level while the lower edge of the canopy hangs down to or below water level.

The canopy in a further form has a recessed roof portion supported on the upper canopy support arms, an extended lower body portion supported on the lower canopy support arms, and a rearwardly and upwardly narrowing trapezoidal or triangular opening corresponding to the endpoints of the support arms. This provides an unmatched combination of weather protection, concealment, and field of view/fire.

The baseless design of the blind allows it to be used with a separate treestand platform of known type, where the blind is mounted to a tree above the treestand platform, such that the hunter may alternate between sitting on the blind seat and standing on the treestand platform, and may rest his feet on the platform while sitting. In a preferred form the seat and support arm members on the frame are sized and adjustable in a manner allowing them to be unfolded and extended while the hunter is standing on the treestand platform, without having to move his feet on the platform.

These and other features and advantages of the invention will become apparent upon further reading of the specification, in light of the accompanying drawings.

BRIEF DESCRIPTION OF THE DRAWINGS

FIGS. 6A and 6C are front perspective and plan views of the frame with canopy and packbag of FIG. 6.

FIG. 7 is a perspective view of a third, preferred embodiment of a blind frame according to the invention, showing its opened, extended condition in phantom and its collapsed or folded condition in solid lines.

FIG. 10 is similar to FIG. 8, but shows the blind mounted on the tree in complementary fashion with a treestand platform.

FIG. 10A is similar to FIG. 10, but shows the position of a hunter's feet standing on the treestand platform relative to the unfolding of the frame of the blinds of FIGS. 3 and 6.

DETAILED DESCRIPTION OF THE INVENTION

Figure 1A:
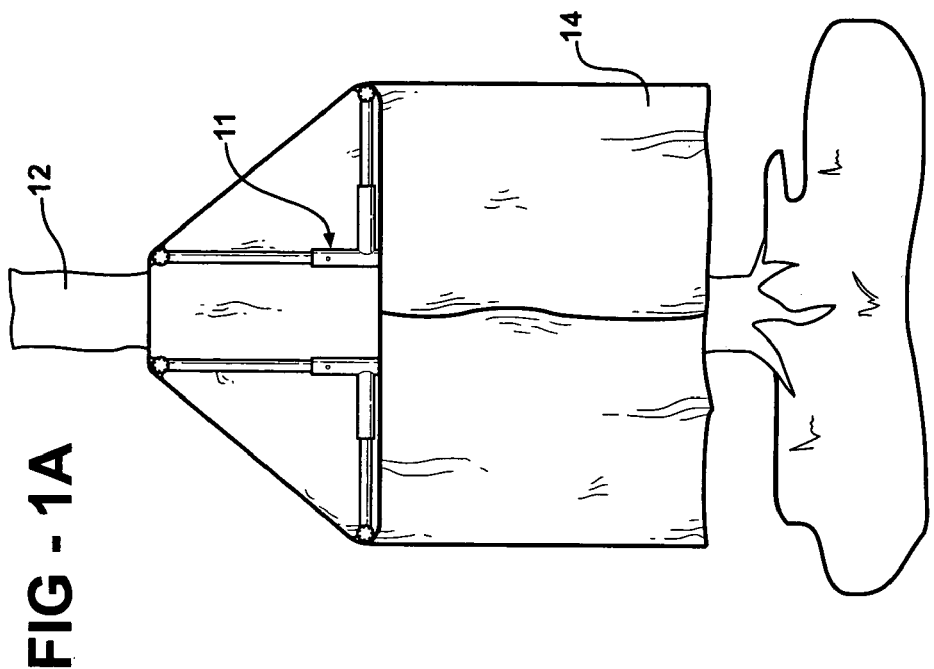
FIG. 1A is a front elevation view of the blind of FIG. 1.
Figure 1:
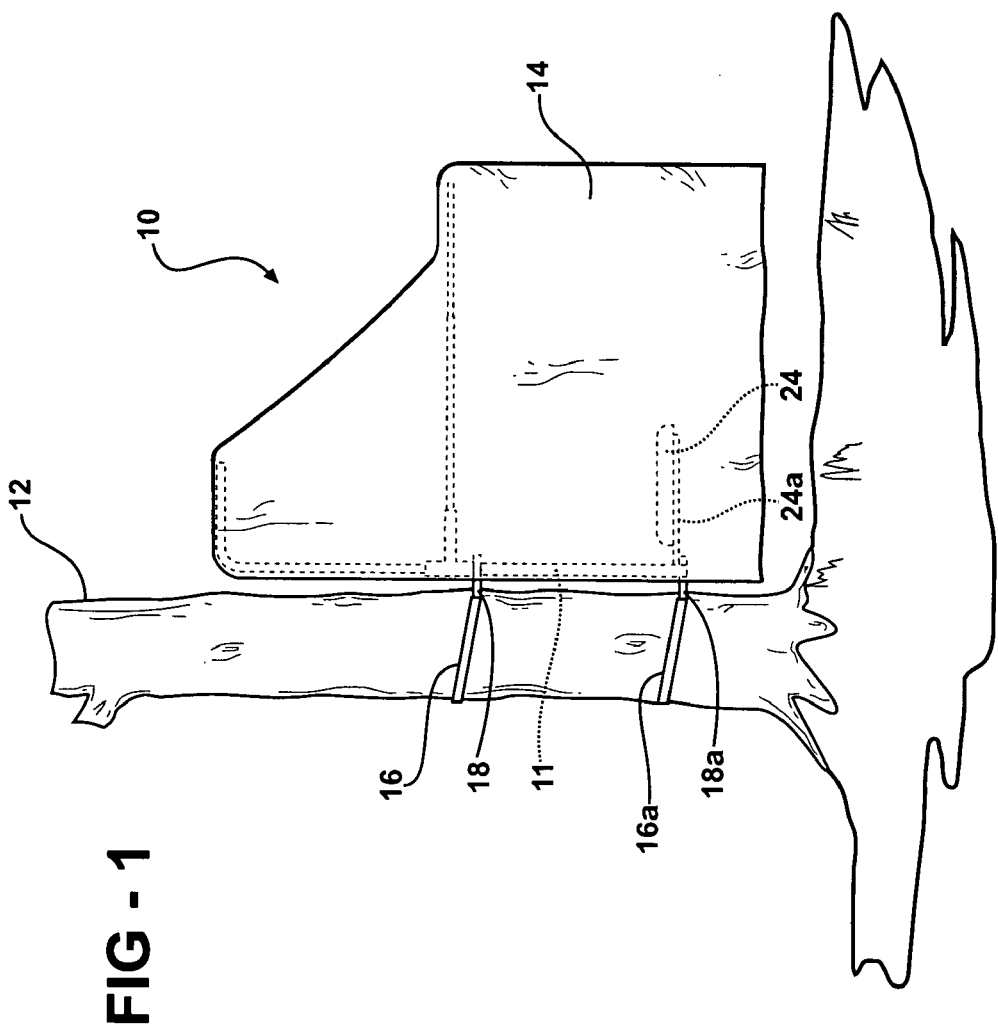
FIG. 1 is a side elevation view of a blind according to the invention, mounted on a tree for ground level hunting, with a canopy in place on a frame and the frame shown in hidden lines underneath the canopy.
Figure 2:
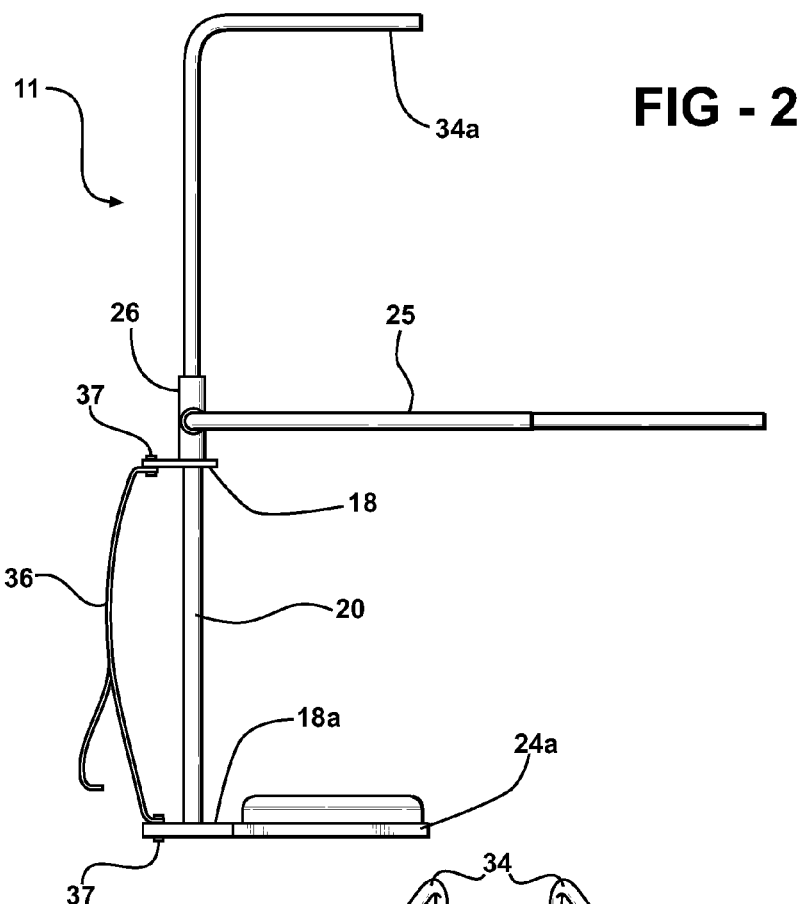
FIG. 2 is a side elevation view of a first detailed embodiment of the blind frame of FIG. 1.

Referring first to FIGS. 1, 1A and 2, the invention is illustrated in a general, schematic view in which a blind 10 is mounted to the side of a tree 12, raised off the ground sufficiently for a hunter to sit in the blind with his feet resting on the ground. Blind 10 has a frame 11 supporting and covered by a fabric covering 14 for weather protection and concealment of a hunter sitting inside. Covering 14 is preferably made from a generally taut-fitting and flexible material, such as (but not limited to) weatherproof nylon, polyester, vinyl, or canvas. Blind 10 is shown mounted to tree 12 with two flexible straps, an upper strap 16 and a lower strap 16a (optional), which are attached to portions of frame 11, for example the upper strap to an upper bracing member or yoke 18 and the lower strap to a lower bracing member or yoke 18a, using known fasteners such as clips or hooks. The straps wrap around the tree trunk in direct contact with the tree bark to secure the frame to the tree.

Blind frame 11 can be carried as a backpack with shoulder straps 36 (FIG. 2), whose ends are also attached to upper and lower yoke members 18 and 18a in known fashion, for example with backpack type clevis pins, hooks and D-rings, or other known fasteners at 37.

Frame 11 includes a seat 24 mounted on a seat support 24a attached to lower yoke 18a, preferably in removable or foldable fashion, for example by means of a hitch-type connection or a pin and/or hinge structure, whereby seat support 24a (and the seat) can be removed or folded up flat against the frame. Seat 24 and support 24a can be separable assemblies, or can be integrated as a unit.

Figure 3:
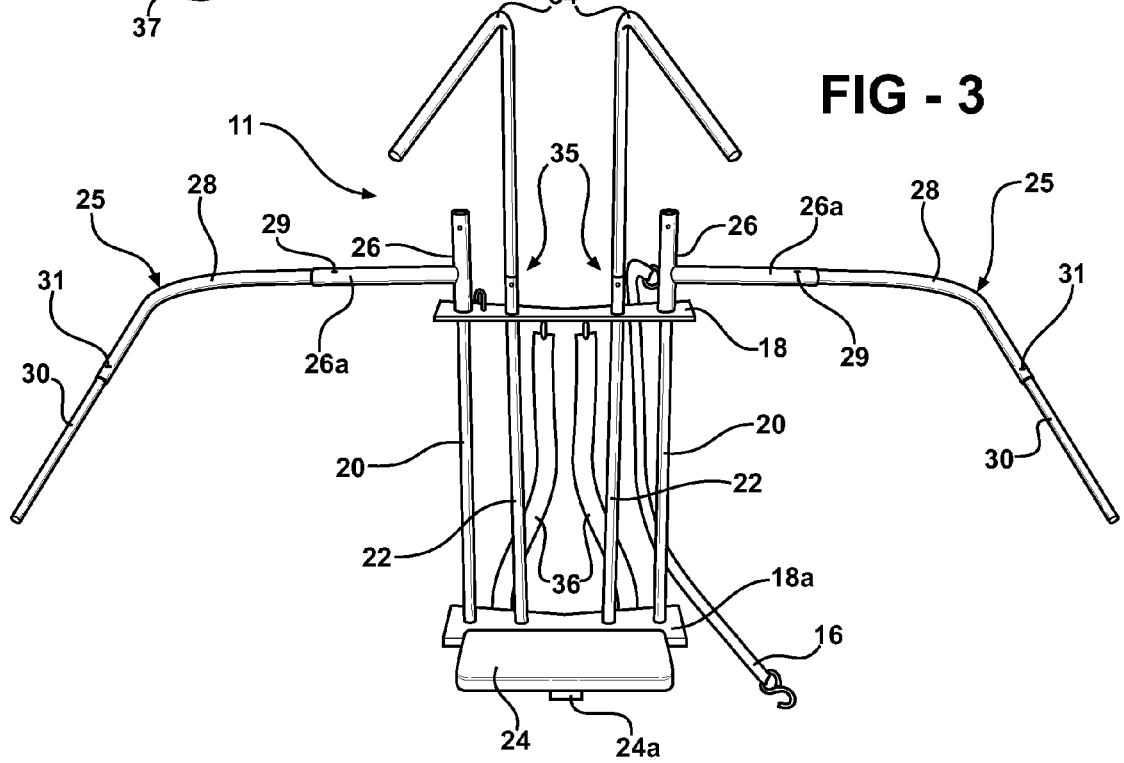
FIG. 3 is a front perspective view of the blind frame of FIG. 2.

Frame 11 is shown in detail in FIGS. 2 and 3, with outer and inner vertical frame supports 20, 22 extending between and connecting yokes 18 and 18a, and having upper ends projecting above upper yoke 18 to support corresponding pairs of adjustable canopy support arms 25 and 34, respectively. Support arms 25 support a lower body portion of canopy 14, while support arms 34 are canopy roof supports.

The above-described components of frame 11 are preferably made from light but strong metal, such as light-gauge steel or aluminum plate and tubing, although it will be recognized by those skilled in the art that other metals and materials could be used, for example plastics or fiber/resin composites, and that different materials could be used in combination for different parts of the frame. The tree-attachment and shoulder straps are made from typical materials such as nylon webbing of suitable strength and abrasion resistance.

Still referring to FIGS. 2 and 3, right and left canopy support arms 25 include right and left side rotating tees 26, which rotate on upper ends of frame supports 20 (not visible) above upper yoke 18. The illustrated tees are made of tubing to accept the smaller diameter tubing of right and left side rotating elbows 28, which in turn accept the tubing of right and left side telescoping arms 30. Elbows 28 accordingly telescope into and out of the lateral ends 26a of rotating tees 26, and arms 30 telescope into and out of the ends of elbows 28. Rotating tees 26 and the inner ends of elbows 28 preferably include positive locking means of known type commonly used in rotating tube connections, such as thumb screws or spring detent buttons at 29 and 31, to lock them rotationally and/or longitudinally in position on uprights 20. Elbows 28 and end arms 30 also preferably include lock means of known type, such as spring detents commonly used in telescoping poles, to lock them in their extended positions.

Upper canopy or "roof" support arms 34 are telescopically mounted in the upper ends of vertical inner frame support tubes 22, in the illustrated embodiment being of a smaller diameter than support tubes 22. Support arms 34 are also preferably rotatably adjustable in supports 22. Various known telescopic and rotational locking mechanisms can be used to lock support arms 34 in their extended and rotated positions, for example spring detent buttons 35 or thumb screws operable to lock arms 34 at variable heights and in different rotational positions.

Figure 4:
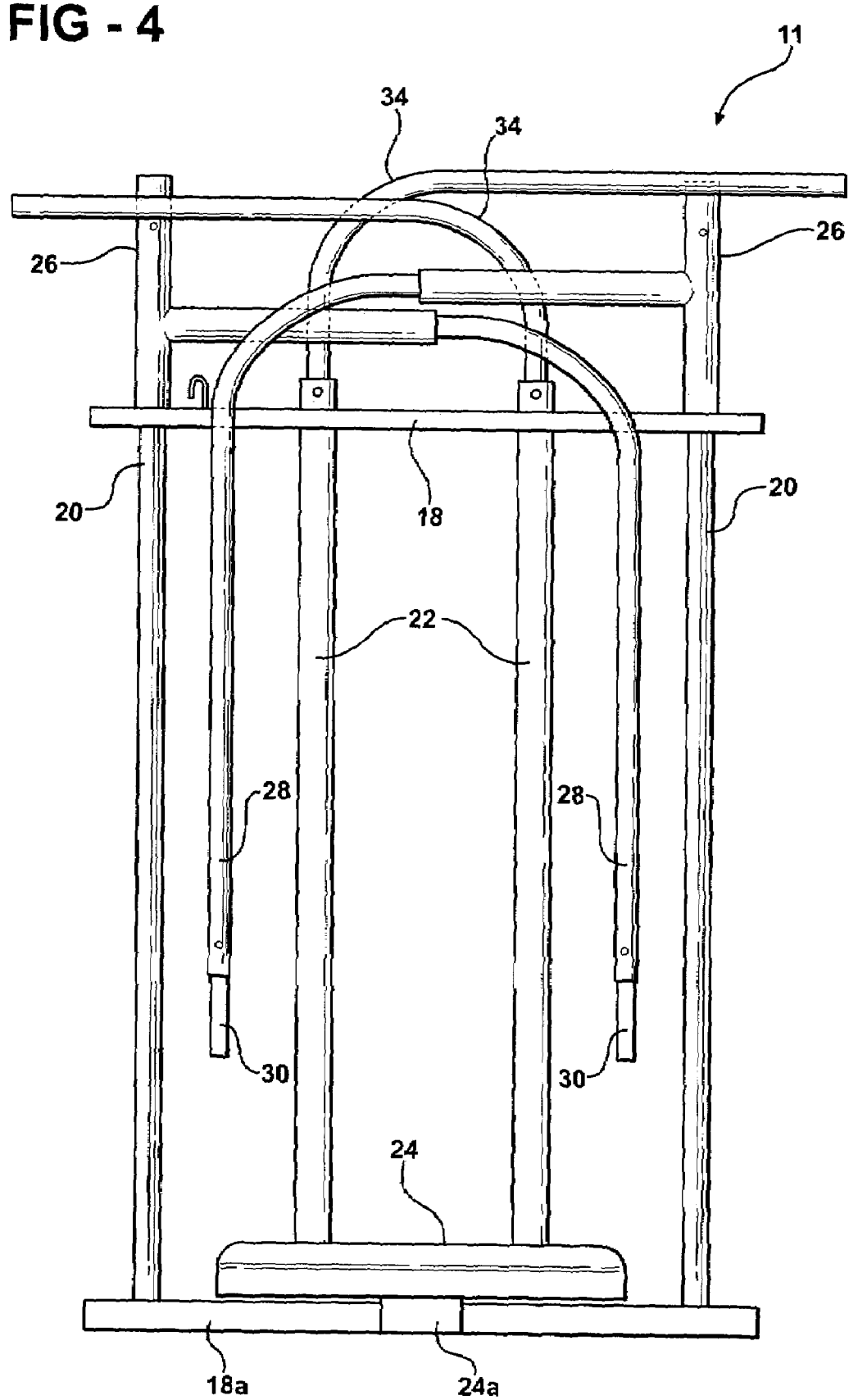
FIG. 4 is a front elevation view of the blind frame of FIG. 2, folded.
Figure 5:
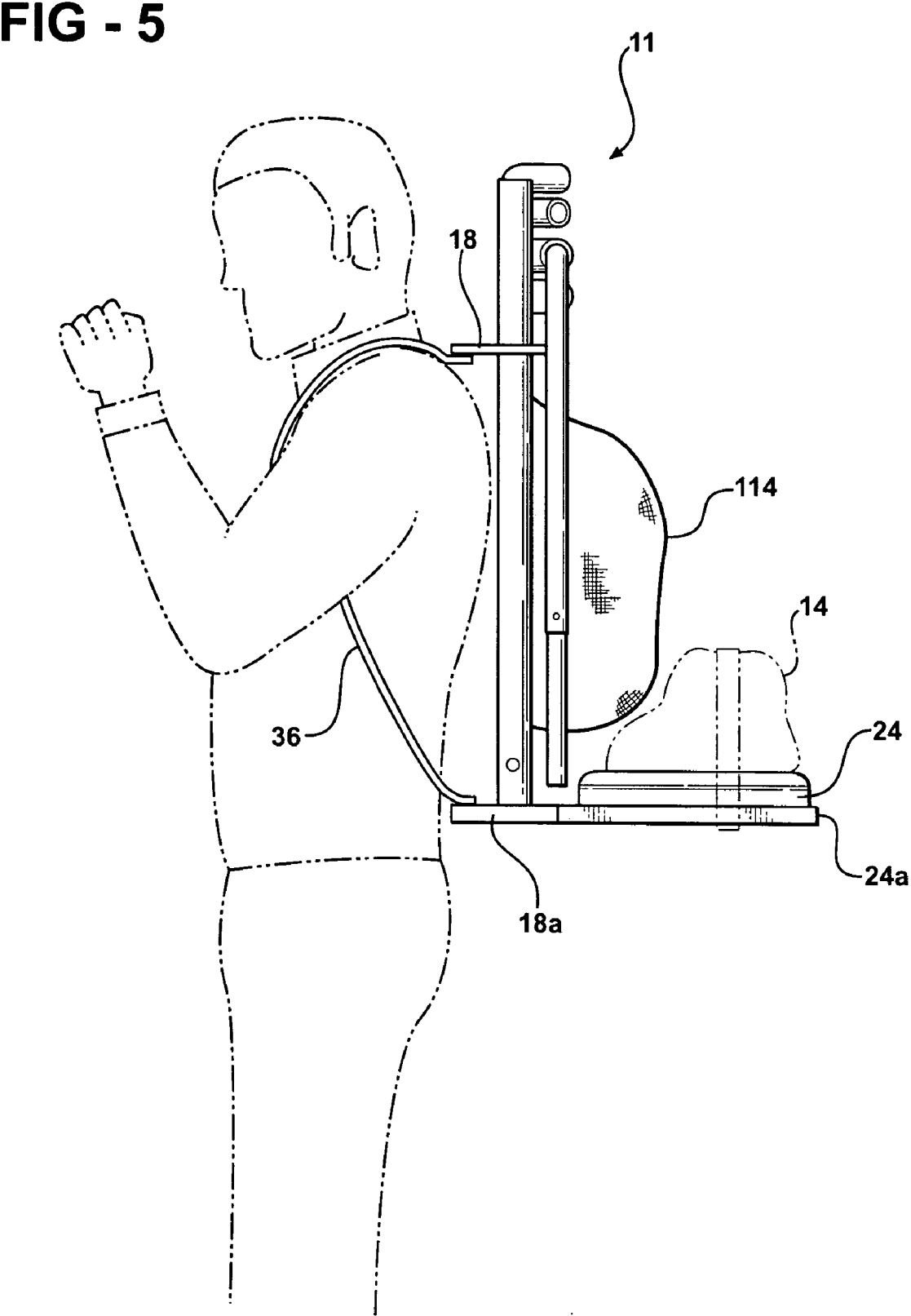
FIG. 5 is a side elevation view showing the folded blind frame of FIG. 2 being carried like a backpack.

FIGS. 4 and 5 show frame 11 folded or collapsed for carrying and use as a backpack. Roof support arms 34 are unlocked and telescoped down into supports 22, and their lateral or outer portions 34a are rotated inwardly to lie flat against the upper ends of tees 26 on supports 20. Arms 30 are telescoped into elbows 28, elbows 28 are telescoped into tees 26, and tees 26 are likewise rotated inwardly to lie flat against the frame. Seat support 24a and seat 24 are preferably left in the extended position to serve as a gear support shelf. Canopy 14 can be removed from frame 11 and rolled or folded and secured to frame 11, either directly as shown in phantom in FIG. 5, or in an attached packbag 114 secured to the frame, and additional gear can be secured directly to the frame or in the packbag. It may even be possible to configure the canopy to function as a pack bag after being partially or fully removed from the support arms.

Opening frame 11 to use as a blind is simply done in reverse. The user carries the blind like a backpack until a suitable location is found. The tree-engaging faces of the upper and lower yokes 18 and 18a are held against a tree while the upper belt 16 is passed around the tree and fastened to the upper belt anchor, for example on the upper yoke 18. With the frame thus mounted against the tree, any lock members on the tees 26 are released, and the tees swung out approximately 180° and then locked in place, such that the tees are roughly in the same plane as the upper yoke 18. The rotating elbows 28 are next unlocked and rotated upwardly approximately 90° and then locked in place. The end arms 30 are then released, telescopically extended away from the tree the desired distance, and locked in place. The roof support arms 34 are then unlocked, raised to the desired height, rotated about 90° outwardly to point away from the tree generally parallel with arms 30, and then locked vertically and rotationally in position. Canopy 14 can then be draped over frame 11 and secured in place on the frame with snaps, ties, hook-and-loop or other known fasteners in the configuration shown in FIG. 1.

Figure 6:
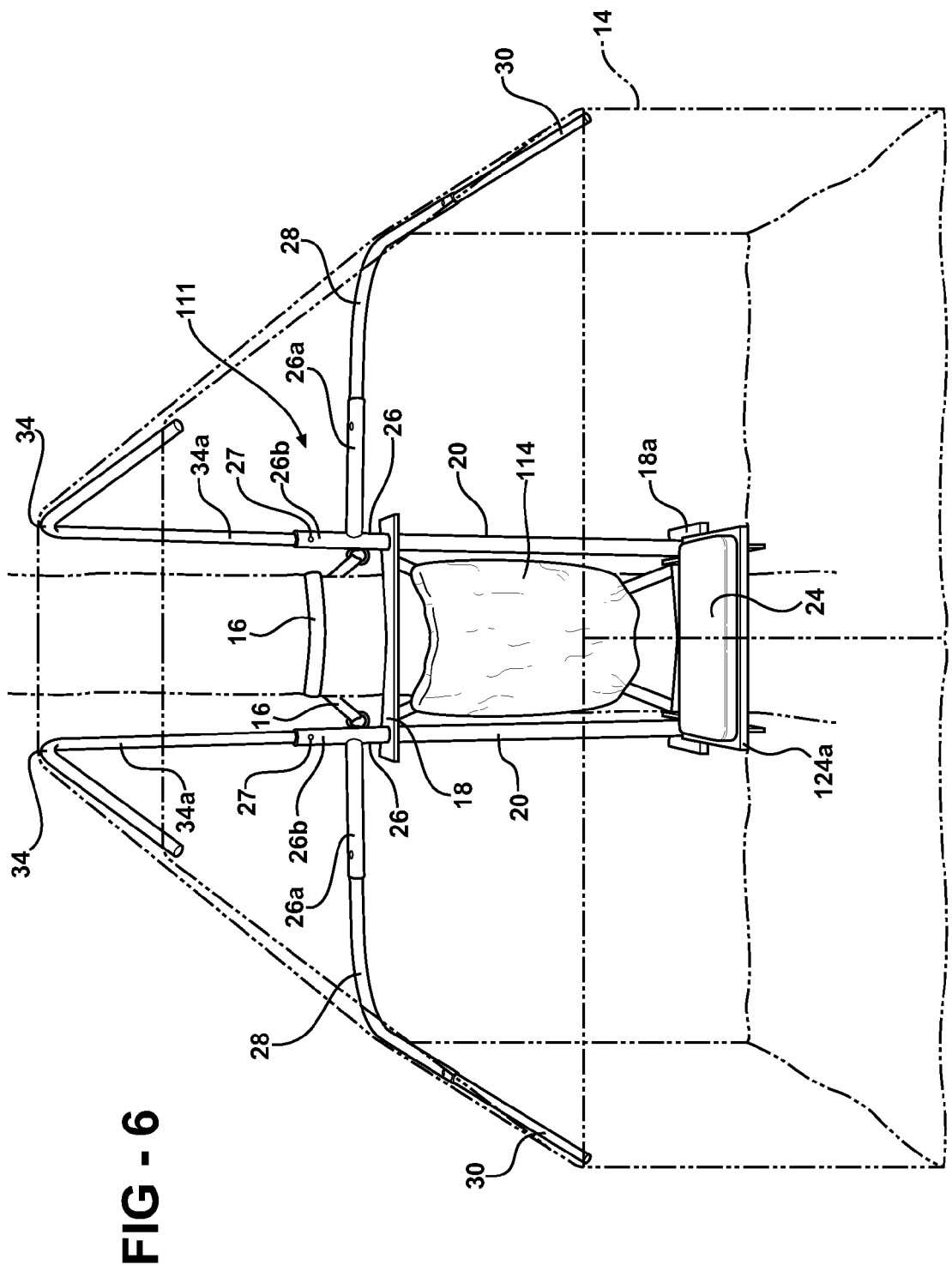
FIG. 6 is a front elevation view of a second embodiment of a blind frame according to the invention, mounted on a tree and with the canopy in phantom.
Figure 6B:
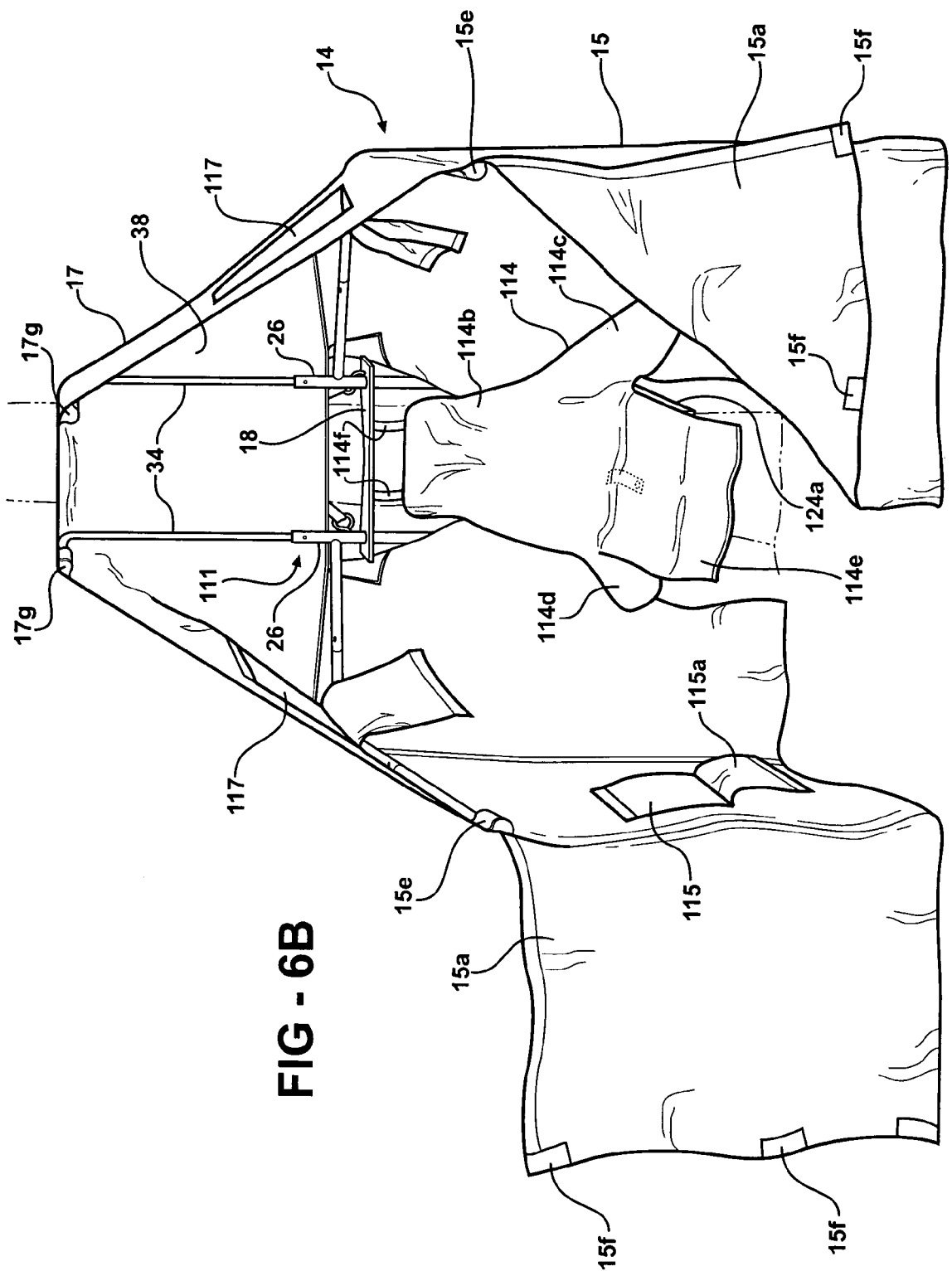
FIG. 6B is similar to FIG. 6, but with the canopy shown in solid lines in greater detail, secured to the frame and partially opened in front.

Referring next to FIGS. 6 and 6A–6B, a second embodiment of a blind according to the invention has a modified frame 111, in which the number of vertical supports has been reduced to two for a lighter, simpler, more preferred construction. Inner vertical frame supports 22 have been eliminated and upper canopy support arms 34 are telescopically and rotationally mounted in the upper ends 26b of rotating tees 26. The diameter of at least the vertical lower ends of support arms 34 is less than the inner diameter of tees 26 and of outer frame support tubes 20, such that the vertical portions 34a of support arms 34 can be telescoped fully into tees 26 and tubes 20 when their vertical locking mechanisms at 27, for example spring detents similar to 29 described above, are released. FIG. 6 also shows a modified, preferred seat support 124a. Otherwise the structure and function of frame 111 is the same as that described above for frame 11, and frame 111 uses the same canopy 14.

FIG. 6A shows a preferred pattern for canopy 14 laid flat relative to frame 111, with some seams separated to better show the pattern. The lower body 15 of the canopy 14 includes sidewalls 15a secured by sewing or other known fabric attachment methods to rear wall 15b along their side edges. The upper side edge 15c of rear wall 15b is preferably continuous, while the lower side edge 15d is preferably split and provided with adjustable fasteners such as fabric ties 13 to pull the split edges together and adjust the tension of the lower canopy body 15 on frame 111. The upper, inside, intermediate edges of sidewalls 15a are provided in the illustrated embodiment with fabric pockets or sleeves 15e designed to fit over the outer ends 30 of canopy support arms 25. The outer edges of the forward portions of sidewalls 15a are provided with fasteners 15f such as mating snaps, ties, or hook-and-loop material to temporarily join and tension the front edges of the sidewalls to enclose the hunter.

The upper or roof portion 17 of canopy 14 is shaped, cut and sewn to fit around and be supported by upper canopy support arms 34, and to be attached to lower canopy portion 15 along the top edges of the rear walls 15b, for example by sewing the lower edge 17b of rear panel 17 to the top edge 15c of rear wall 15b. Outer "wing" portions of upper canopy 17 have compound-angled rear edges 17c that are sewn or otherwise attached to the side edges of rear panel 17a; outer edges 17d and 17e designed to be sewn or otherwise attached to the upper edges of lower canopy sidewalls 15a and to wrap around the curve of lower canopy support arm elbows 28; and angled front opening edges 17f that define the front opening of the blind canopy. Pole pockets 17g receive the ends of canopy arms 34, as best shown in FIG. 6B.

FIG. 6B (and FIGS. 1 and 1A) show the rearwardly and upwardly angled, generally triangular front opening 38 formed in the canopy around the frame. A hunter sitting on seat 24 or standing against tree 12 is protected from wind, rain, sun, and snow from above and both sides, and from the front over his lower half, by canopy 14, while having unobstructed front views and increased peripheral vision at eye-level due to the rearwardly and upwardly sloping angle of opening 38. It will be understood by those skilled in the art that opening 38 (as viewed from the front of the blind) need not be a perfect triangle, and that the term "triangular" is intended to include modified triangular shapes such as the trapezoidal or flattened-triangle opening shown in the drawings, with the bottom of the opening being wider than the top.

The hunter's observation and shooting options can be further improved with windows such as 115 and 117 (FIG. 6B) formed in the sides of the upper and lower canopy portions 15 and 17. The windows are preferably closed by simple flaps 115a of the canopy fabric that can be secured with ties, snaps, hook-and-loop, etc. in closed positions for concealment and weather protection, and dropped down or rolled up for increased view or extra shooting angles.

FIGS. 6A and 6B also show a preferred pattern for packbag 114, in which fabric similar to that used in canopy 14 is cut in a cruciform pattern. The center panel 114a is secured along its top edge to upper frame yoke 18, for example with known connectors such as straps 114f, grommets, and pins, allowing the top/front, side, and bottom/front panels 114b–114e to be opened up like petals to receive the rolled or stuffed canopy and/or gear. Fasteners of known type along the outer edges of panels 114b–114e are used to secure the panels to one another after the panels are folded or wrapped around the pack contents. It will be understood by those skilled in the art that other forms of packbag can be used with frame 111, including many commercially available types, particularly those designed for attachment to external frame backpacks.

A benefit of the cruciform pattern packbag 114 is that the bottom/front panel 114e can be draped over seat 24 when the pack is opened up, and could include padding or a sleeve to hold extra clothing for the hunter's comfort and insulation.

Referring next to FIG. 7, another and most preferred embodiment of a blind frame according to the invention is shown at 211. The tubular vertical supports and flat, plate-like yokes from earlier embodiments have been replaced with lightweight hollow rectangular members to form vertical supports 220 and yokes 218 and 218a. The rotating tee connections for the lower canopy support arms are replaced with one or more horizontal channel members 226 fixed to the upper yoke, in the illustrated embodiment a single tube secured by welding to upper yoke 218 to receive the inner ends of elbows 228 in both telescoping and rotating fashion. Inner vertical supports 222 similar to supports 22 in the embodiment of FIGS. 1–5 both brace the frame and provide telescopic storage and rotatable support for canopy roof support arms 234. Seat assembly 224 is the same as that shown in FIG. 6, with a rotating pin connection 235 to the lower inside ends of outer frame members 220.

As shown in solid lines, the frame 211 of FIG. 7 makes a very compact, flat package to transport and carry. Seat assembly 224 is preferably flush with or recessed into the volume defined between frame members 218 and 220 when folded up. As shown in phantom lines, the frame is opened up by first preferably securing it to the side of a tree as described above, via yoke members 218 and 218a using cable or straps; rotating elbow support arm member(s) 228 up approximately 90° and locking in place with lock means 229 (in the embodiment of FIG. 7, wing-nut type friction screws), and extending end arms 230 from the raised elbows 228 to the desired length; raising roof supports 234 up to the desired canopy supporting height, rotating them out approximately 90°, and locking them in place with the provided lock means such as screws 227; and folding out seat assembly 224. It should be understood that the foregoing order is the preferred but not the only possible order in which to open up, unfold, and extend the frame's arm and seat members.

Another advantage of the frame design of FIG. 7 is found in the manner in which elbow members 228 can be deployed and stored without crossing the space bounded by seat assembly 224 and the space occupied by the hunter. This allows for a compact set-up/takedown procedure in which the hunter need not move his feet while facing the blind. This can be particularly important where the hunter is standing on an elevated platform such as a ladder step or a treestand platform while setting up or taking down the frame.

Figure 8:
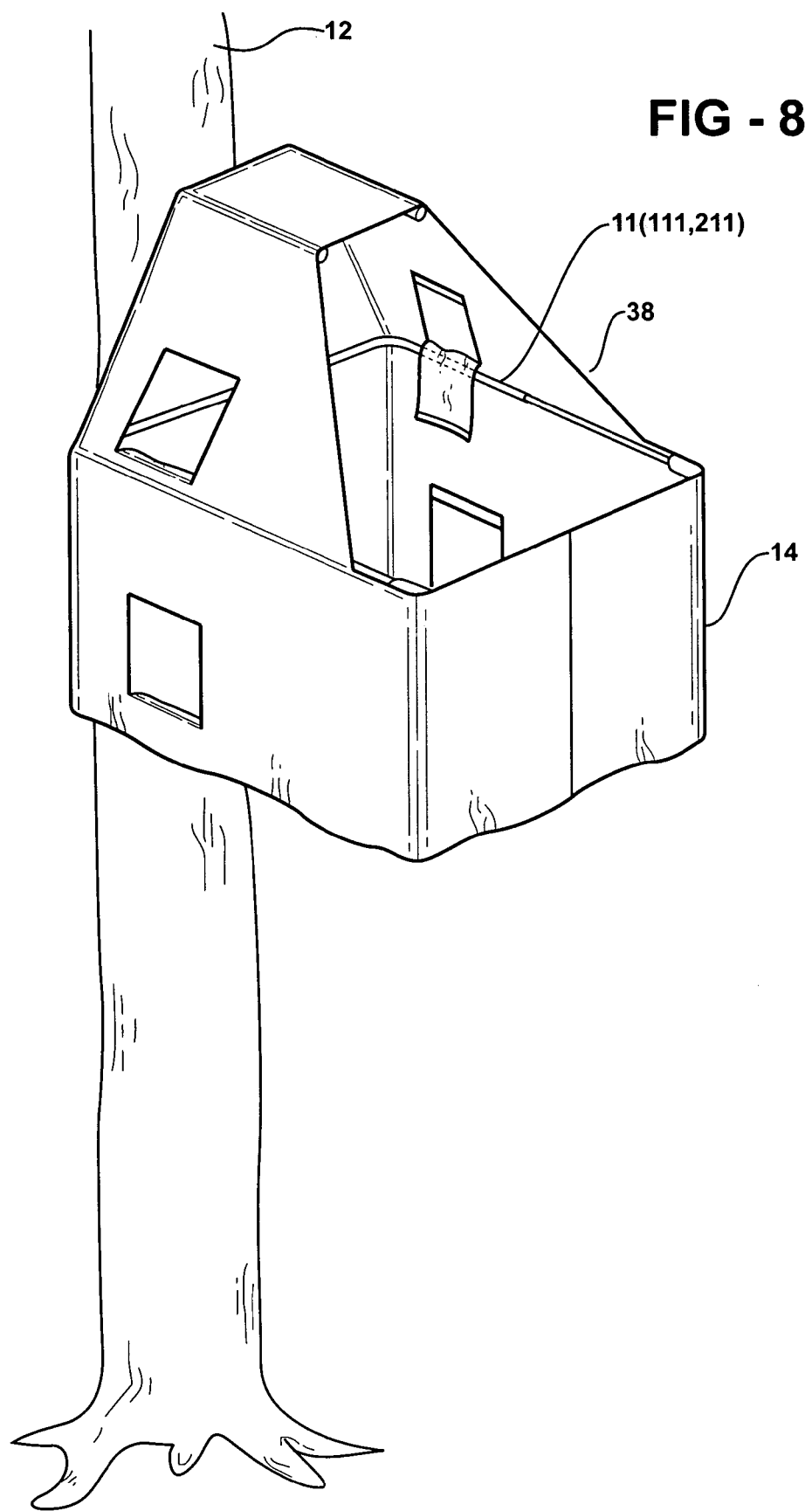
FIG. 8 is a perspective view of a blind according to the invention mounted for elevated treestand hunting.

FIG. 8 shows a blind 10 using any of frames 11, 111, or 211 and canopy 14 mounted well above ground level for elevated treestand hunting. It will be apparent to those skilled at treestand hunting that the baseless, open-bottomed blind and angled opening 38 offers clear shots at game directly below the blind, unlike many other types of treestand or blind, while maintaining superb weather protection and concealment.

Figure 9:
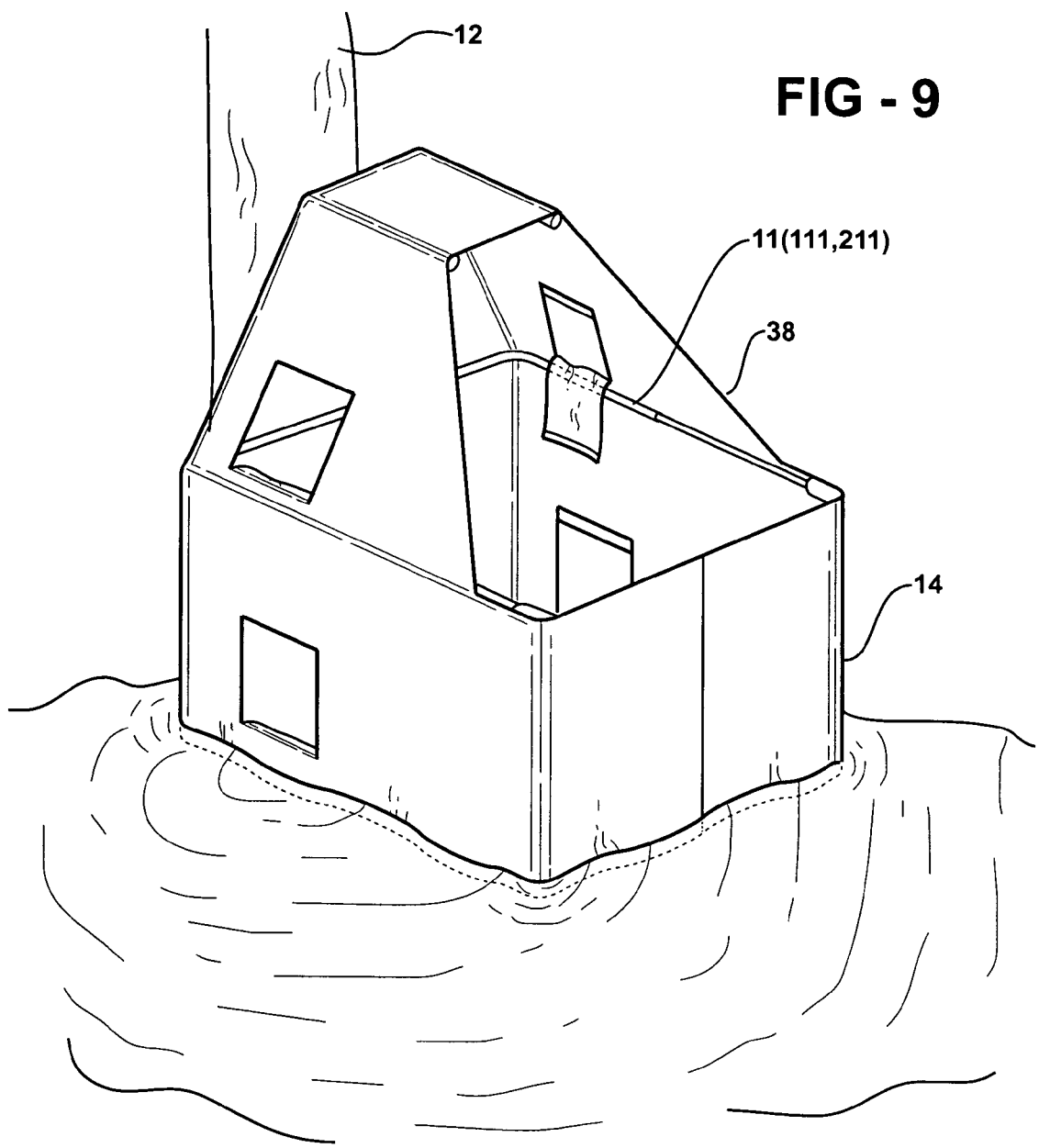
FIG. 9 is similar to FIG. 8, but shows the blind mounted for flooded timber hunting.

FIG. 9 illustrates the blind of FIG. 8 being used for flooded timber hunting, where the frame 11 (or 111 or 211) is secured to the side of a tree 12, with seat 24 raised above the water a desired height to give the hunter a dry seat, and with the free-hanging lower edge of canopy 14 near or touching or preferably submerged (hidden lines) in the water. By placing the lower edge of canopy 14 in the water, the hunter's legs and feet remain completely hidden, and the canopy fabric will both serve to reduce hunter noise that would otherwise be reflected off the surface of the water, and to dampen any ripples or surface disturbance that would tend to travel beyond the blind and spook game. The baseless design of the blind further ensures that the hunter will not trip over submerged portions of the blind.

FIG. 10 shows the blind of FIGS. 8 and 9 mounted on a tree above a conventional treestand platform 300, such that the hunter can alternately sit on the blind's seat 24 or stand on platform 300. Ideally the seated hunter will be able to rest his feet on platform 300. As platform 300 will extend further from the tree than seat 24, the hunter will also be able to turn around on the platform (while concealed) to adjust the frame, and to set up and take down the frame. As shown in FIG. 10A, the rotating and telescoping design of the canopy support arms 25 and 34 allows the hunter to both set up and take down the canopy and frame without moving his feet, a significant benefit. Roof support arms are raised above the hunter's head while folded closed (solid lines) before being rotated out to the canopy support position, and telescoped lower arms 25 can be rotated outwardly above the lowered seat 24 with clearance for the hunter's feet and legs on the platform 300, before being rotated up and telescoped out.

Figure 11:
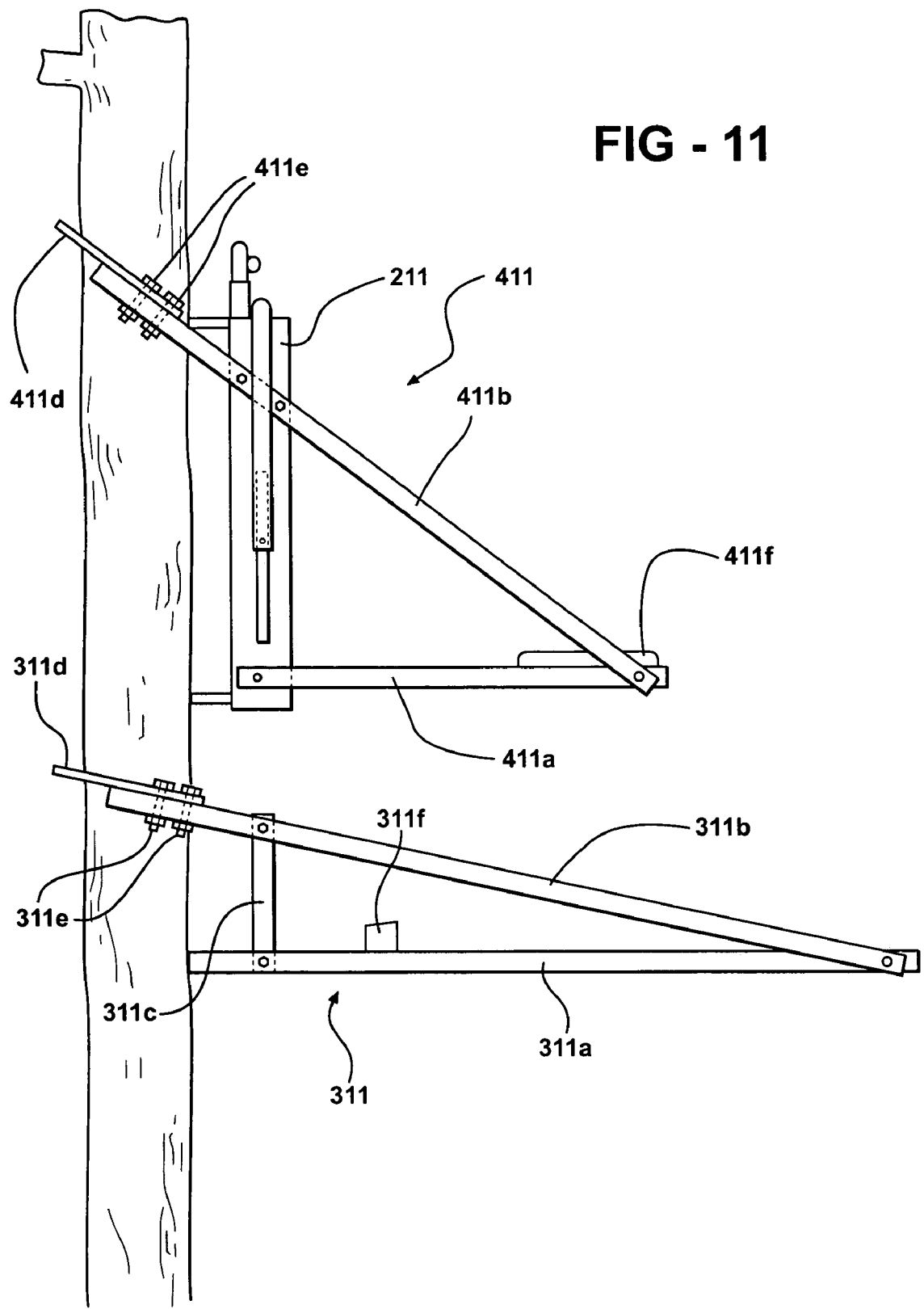
FIG. 11 is a side elevation view of the blind frame of FIG. 7 modified with a climbing attachment for use with a climbing treestand platform.
Figure 11A:
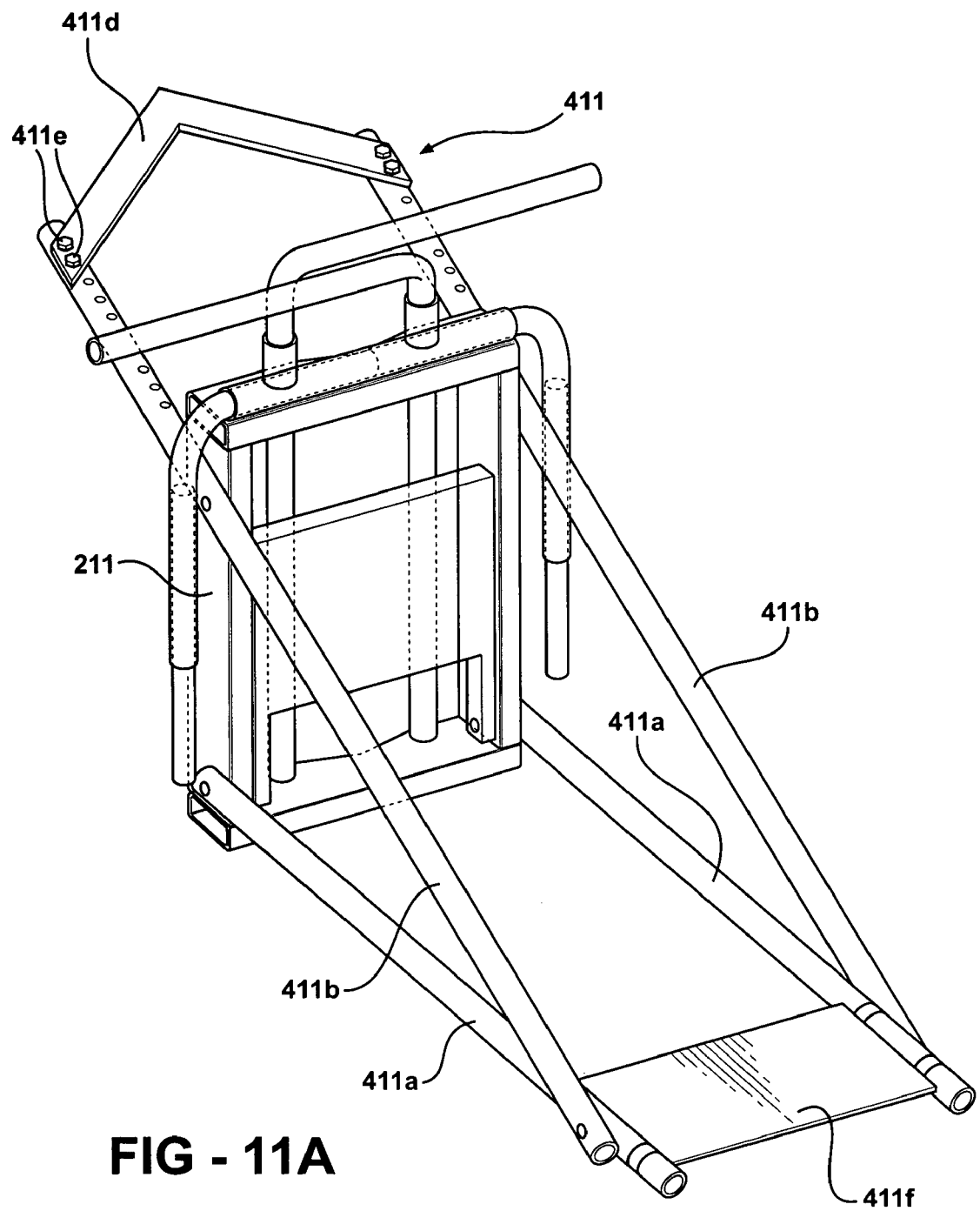
FIG. 11A is perspective view of the modified blind frame of FIG. 11.

Referring next to FIGS. 11 and 11A, blind 211 from FIG. 7 is shown modified with a climbing attachment 411 that allows it to be used with a conventional self-climbing type treestand platform 311. Climbing platforms such as 311 are often sold with an accompanying climbing device similar to 411, and in known manner a hunter first hikes the upper climbing device a short distance up the side of a tree, and then pulls the climbing platform up a similar distance with his feet. By repeating this two-step process, the hunter can work his way quite high in the tree, each component of the climbing assembly locking itself against the tree with an angled gripping member, in the illustrated embodiment a rigid angled metal bar 311d that is adjustably mounted with bolts 311e to the tree-side ends of angled frame members 311b. The platform portion 311a usually includes a toe opening or toe-strap such as 311f for the hunter to hook his feet and pull the platform up. The angled upper frame members 311b and the platform 311a are connected at 311c so that pulling up on the platform lifts frame members 311b relative to tree-gripping arm 311d. Gripping arm 311d is rotated downwardly, unlocking it relative to the tree, is then pulled up the side of the tree with the toe-lifted platform a corresponding distance, and then locks in place in the new, elevated position as the frame and platform are released for the next climbing cycle.

Climbing attachment 411 works in similar fashion, via an angled tree-gripping member 411d, but is bolted or otherwise secured at 411e to blind frame 211 such that frame 211 forms the connection between angled climbing frame members 411b and horizontal climbing frame members 411a, which are provided with an extended seat 411f, for example a strong mesh or fabric. Climbing seat 411f is adjustably spaced from blind seat 224 by sliding it on horizontal frame members 411a, so that the hunter can sit on seat 411f facing the tree, with his legs passing through the space between the seats and with his feet alternately standing on platform 311a and pulling on lift strap 311f. Blind frame 211 accordingly functions as a force-transferring part of climbing attachment 411. Attachment 411 can be left in place on the blind frame as shown while hunting, with the gripper 411d taking the place of tree-attachment cables, and the horizontal frame members 411a and climbing seat 411f can be sized to lie within the confines of the blind canopy. Climbing seat 411f even offers the advantage of a small table-like surface for the hunter in the blind, where lunch, binoculars, calls, etc. can be stored within easy reach.

It will be understood from the foregoing examples of one or more preferred embodiments of the invention that various changes can be made without departing from the scope of the invention as defined by the following claims.

I claim:

1. A tree-mountable backpack blind for use by hunters and others, comprising:
    a generally planar vertical frame comprising a tree-facing side including tree-securing means for securing the vertical frame to a side of a tree or similar vertical structure, the vertical frame further comprising a baseless lower end adapted to be held above the ground when the vertical frame is secured to a side of a tree or similar vertical structure, the vertical frame further comprising cantilevered upper and lower canopy support arms having a storage position stowed essentially flat against the frame and an extended position extending horizontally from a tree-opposing side of the vertical frame;
    a seat mounted on a lower portion of the vertical frame below the lower canopy support arms to extend horizontally away from the tree-opposing side of the frame; and,
    a canopy adapted to be supported on the upper and lower canopy support arms when the upper and lower canopy support arms are in their extended position, the canopy having an open bottom with a lower edge spaced from and hanging freely below the seat.

2. The blind of claim 1, wherein the vertical frame comprises a spaced pair of upper canopy support arms and a spaced pair of lower canopy support arms, the lower canopy support arms having a greater lateral spacing at outer ends thereof in the extended position and the upper support arms having a lesser lateral spacing at outer ends thereof in the extended position.

3. The blind of claim 2, wherein the lower canopy support arms extend horizontally away from the tree-opposing side of the vertical frame a distance greater than the upper canopy support arms.

4. The blind of claim 3, wherein the canopy comprises a generally triangular planar front opening above the lower canopy support arms and defined in part by canopy sidewall portions above the lower canopy support arms, the front opening corresponding to the lesser lateral spacing of the upper support arms and the greater lateral spacing of the lower support arms in their extended positions, the generally triangular planar front opening being angled rearwardly and upwardly from the lower canopy support arms to the upper canopy support arms.

5. The blind of claim 4, wherein the canopy comprises an upper canopy portion above the lower canopy support arms and defining the generally triangular front opening, and a lower closable canopy portion extending horizontally beyond the upper canopy portion.

6. The blind of claim 3, wherein the lower canopy support arms extend horizontally away from the vertical frame a distance greater than the seat.

7. The blind of claim 1, wherein the upper and lower canopy support arms are capable of being telescoped and rotated without disassembly from their horizontally extended positions to storage positions generally flat against the frame.

8. The blind of claim 7, wherein the upper canopy support arms comprise vertically-extendable portions movable up and down relative to the vertical frame, and horizontal portions rotatable against and away from the vertical frame.

9. The blind of claim 1, wherein the vertical frame comprises backpack straps.

10. The blind of claim 9, wherein the vertical frame comprises a packbag.

11. The blind of claim 1, wherein the seat can be moved to a storage position against the vertical frame.

12. The blind of claim 1, wherein the lower end of the canopy hangs below the baseless lower end of the vertical frame when the vertical frame is secured to a side of a tree or similar vertical structure.

13. A tree-mountable backpack blind for use by hunters and others, comprising:
    a generally planar vertical frame capable of being secured to a side of a tree or similar vertical structure, the vertical frame comprising upper and lower canopy support arms extending horizontally from the vertical frame away from a tree or similar vertical structure and a seat extending horizontally from a lower portion of the frame away from a tree or similar vertical structure below the lower canopy support arms; and,
    a canopy supported on the upper and lower canopy support arms, the canopy comprising an open bottom with a lower edge hanging below the seat,
    wherein the upper and lower canopy support arms are capable of being telescoped and rotated without disassembly from their horizontally extended positions to storage positions generally flat against the frame and wherein the lower canopy support arms are rotatably mounted on the vertical frame for rotation about a horizontal axis on the vertical frame.

14. The blind of claim 13, wherein the lower canopy support arms comprise horizontally-extendable portions movable inwardly and outwardly along the horizontal axis relative to the vertical frame to adjust the width of their spacing.

15. The blind of claim 14, wherein the lower canopy support arms are rotatably mounted on vertically-rotatable bases mounted on the vertical frame, the vertically-rotatable bases being rotatable about a vertical axis in the plane of the vertical frame.

16. The blind of claim 13, wherein the lower canopy support arms comprise laterally extendable end extensions.

17. A tree-mountable backpack blind for use by hunters and others, comprising:
    a generally planar vertical frame comprising a tree-facing side including tree-securing means for securing the vertical frame to a side of a tree or similar vertical structure, the vertical frame further comprising a baseless lower end adapted to be held above the ground when the vertical frame is secured to a side of a tree or similar vertical structure, the vertical frame further comprising canopy support arms extending horizontally from a tree-opposing side of the vertical frame;
    a seat mounted on a lower portion of the vertical frame below the canopy support arms to extend horizontally away from the tree-opposing side of the frame; and,
    a canopy adapted to be supported on the canopy support arms, the canopy having an open bottom with a lower edge spaced from and hanging freely below the seat and a roof portion positioned above the seat.

* * * * *